UNITED STATES PATENT OFFICE.

FRANZ WOLF-BURCKHARDT, OF BIEBRICH, GERMANY.

MANUFACTURE OF HOLLOW BODIES FROM QUARTZ 1,031,900. Specification of Letters Patent. Patented July 9, 1912.

No Drawing. Application filed December 23, 1911. Serial No. 667,446.

*To all whom it may concern:*

Be it known that I, FRANZ WOLF-BURCK-HARDT, chemist, a subject of the King of Prussia, and resident of Biebrich-on-the-Rhine, Germany, have invented certain new and useful Improvements in the M nufacture of Hollow Bodies from Quartz, of which the following is a specification.

This invention relates to an improved process for manufacturing and shaping hollow bodies from quartz by fusing the quartz, sand or silica in an electric furnace.

Heretofore it has been proposed to manufacture hollow bodies of quartz by packing the silica around an electrical resistance core and heating the core by the passage of an electric current so as to bring the material to a plastic and agglomerate state. By this means tubular bodies are obtained after removing the core either while the mass is in a plastic state or after the mass has set. The tubular bodies were then expanded by blowing air or gas thereinto under pressure. It has also been proposed to manufacture hollow bodies in a similar manner by fusing a quartz mass on a perforated plate and blowing air or gas through the perforations.

The present invention has for its object to facilitate the manufacture of such hollow bodies and for this purpose a greater width or diameter is imparted to the hollow bodies from the commencement by heating the core at the commencement of the process to such a temperature (viz. about 2000° C.) that the silica around the core volatilizes and sublimes between the particles of silica more removed from the core. By this means an outer layer of silica of better conductivity is formed and thus the agglomeration and fusion of this layer facilitated. Owing to the fusion and agglomeration a considerable decrease in the volume of the mass takes place so that a hollow body is formed a certain distance from the core (about 6 or 7 mm. therefrom) by the contraction of the mass. The hollow bodies thus obtained are of greater diameter than is the case in previously known processes and these hollow bodies may be more conveniently and easily worked into a further state.

I claim:—

1. The process for the manufacture of hollow bodies from silica which consists in fusing a mass of silica around an electrical resistance core by heating the resistance core from the commencement of the process to such a temperature that the silica around the core is volatilized and sublimes in the silica more removed from the core, whereby the silica more removed from the core is rendered more conductive and thus more easily brought to agglomeration and fusion while the volume of the mass decreases so as to form a hollow body around the core.

2. The process for the manufacture of hollow bodies from silica which consists in fusing a mass of silica around an electrical resistance core by heating the resistance core from the commencement of the process to a temperature of about 2000° C., so that the silica around the core is volatilized and sublimes in the silica more removed from the core, whereby the silica more removed from the core is rendered more conductive and thus more easily brought to agglomeration and fusion while the volume of the mass decreases so as to form a hollow body around the core.

In witness whereof I have hereunto set my hand in the presence of two witnesses.

FRANZ WOLF-BURCKHARDT.

Witnesses:
 KITTY HOFF,
 JEAN GRUND.